US012715591B2

(12) United States Patent
Hentges

(10) Patent No.: US 12,715,591 B2
(45) Date of Patent: Aug. 25, 2026

(54) FORCE-INDEPENDENT RELEASABLE SYSTEM

(71) Applicant: Air Cruisers Company, LLC, Wall Township, NJ (US)

(72) Inventor: Robert William Hentges, Wall Township, NJ (US)

(73) Assignee: Air Cruisers Company, LLC, Wall Township, NJ (US)

(*) Notice: Subject to any disclaimer, the term of this patent is extended or adjusted under 35 U.S.C. 154(b) by 1395 days.

(21) Appl. No.: 17/463,179

(22) Filed: Aug. 31, 2021

(65) Prior Publication Data

US 2023/0067665 A1 Mar. 2, 2023

(51) Int. Cl.
*B64D 25/14* (2006.01)
*A62B 1/20* (2006.01)
*B63B 27/14* (2006.01)

(52) U.S. Cl.
CPC ........ *B64D 25/14* (2013.01); *B63B 2027/145* (2013.01); *F16B 2200/63* (2023.08)

(58) Field of Classification Search
None
See application file for complete search history.

(56) References Cited

U.S. PATENT DOCUMENTS 3,463,266 A 8/1969 Day
4,567,977 A * 2/1986 Fisher .................... B64D 25/14 193/25 B
7,467,764 B2 * 12/2008 Hintzman .............. B64D 25/14 244/905
9,296,484 B2 * 3/2016 Biro ....................... B64D 25/14
10,351,251 B2 * 7/2019 Haynes .................. B64D 25/14
10,556,697 B2 2/2020 Haynes et al.
10,836,498 B2 11/2020 Haynes et al.
(Continued)

FOREIGN PATENT DOCUMENTS

CN 206704469 U 12/2017
EP 0163925 A1 * 12/1985 ............... A62B 1/20
(Continued)

OTHER PUBLICATIONS

International Application No. PCT/US2022/041900, International Search Report and the Written Opinion, mailed on Nov. 23, 2022, 11 pages.

(Continued)

*Primary Examiner* — Robert Canfield
(74) *Attorney, Agent, or Firm* — Kilpatrick Townsend & Stockton LLP

(57) ABSTRACT

Force-independent release systems are disclosed. Releasable links are designed for use in connection with inflatable safety devices. Particular examples for use include evacuation slides and/or life rafts on board a passenger transportation vehicle, such as an aircraft or marine vessel, or any other inflatable safety device that requires a rapid inflation. In one example, the force-independent release system separates when a certain inflatable pressure is achieved. In another example, the force-independent release system separates at a certain predetermined time. It is possible for the force-independent release system to also include current force-dependent technology as a redundant backup.

16 Claims, 16 Drawing Sheets

(56) References Cited

U.S. PATENT DOCUMENTS

| | | | | |
|---|---|---|---|---|
| 10,960,839 | B2 * | 3/2021 | Imura | B60R 21/214 |
| 11,352,146 | B2 * | 6/2022 | Bergonnier | B64C 1/14 |
| 12,060,886 | B2 * | 8/2024 | Jeffers | B63C 9/04 |
| 2009/0302155 | A1 * | 12/2009 | Rivault | B63C 9/22 244/105 |
| 2018/0334257 | A1 * | 11/2018 | Haynes | B64D 25/14 |
| 2018/0339779 | A1 * | 11/2018 | Bahena | B64D 25/18 |
| 2020/0130627 | A1 * | 4/2020 | Imura | B60R 21/201 |
| 2021/0047046 | A1 | 2/2021 | Haynes et al. | |
| 2021/0053661 | A1 | 2/2021 | Haynes et al. | |

FOREIGN PATENT DOCUMENTS

| | | | | |
|---|---|---|---|---|
| EP | 1410987 | A2 * | 4/2004 | B64D 25/14 |
| EP | 1759993 | B1 * | 3/2009 | F16K 31/122 |
| EP | 1911674 | B1 * | 11/2012 | B64D 25/14 |
| FR | 3144974 | A1 * | 7/2024 | B63C 9/18 |
| JP | 5861090 | B2 | 1/2016 | |

OTHER PUBLICATIONS

International Application No. PCT/US2022/041900, International Preliminary Report on Patentability mailed on Mar. 14, 2024, 9 pages.

European Application No. 22777424.7, Intention to Grant mailed on Jun. 20, 2025, 8 pages.

* cited by examiner

FORCE-INDEPENDENT RELEASABLE SYSTEM

FIELD OF THE DISCLOSURE

Embodiments of the present disclosure relate generally to force-independent frangible links. The frangible links are designed for use in connection with inflatable safety devices. Particular examples for use include evacuation slides and/or life rafts on board a passenger transportation vehicle, such as an aircraft or marine vessel, or any other inflatable safety device that requires a rapid inflation. In one example, the force-independent frangible link separates when a certain inflatable pressure is achieved. In another example, the force-independent frangible link separates at a certain predetermined time. It is possible for the force-independent frangible link to also include current force-dependent technology as a redundant backup.

BACKGROUND

An evacuation slide is an inflatable slide used to allow passengers and crew to evacuate an aircraft in the event of an emergency. An evacuation slide is required on all passenger-carrying aircraft where the door sill height cannot allow evacuation of persons from the door uninjured. Currently, the Federal Aviation Administration (FAA) requires slides on all aircraft doors where the floor is 6 feet (1.8 m) or more above the ground. Such slides are generally provided with one or more inflatable chambers that are inflated upon being triggered by an emergency situation. Many but not all slides are also designed to double as life rafts in case of a water landing and evacuation. (Accordingly, it should be understood that reference to an evacuation slide herein may also be interpreted to include evacuation slides that subsequently function as life rafts (slide/rafts), as well as standalone life rafts, life vests, exit ramps, exit slide/ramps, or any other appropriate inflatable safety device described herein.)

Evacuation slides are typically packed and held within the door structure inside the slide/door bustle, which is a protruding part inside an aircraft door. A slide bustle typically houses the evacuation slide, as well as the inflation system that will be used to inflate the slide. The slide and inflation system should be safely held in place until an emergency condition requires its use. In other instances, evacuation slides may be stored external to the aircraft fuselage, such as off-wing slides or slides packed into external enclosures.

Accordingly, evacuation slides are typically stored in a bundled configuration with holding straps. Holding straps may be secured via frangible links, geometric restraints, or any other type of holding system. For geometric restraints, the inflatable device is required to be in a certain geometry in order for a pin or other release system to be pulled. Other restraint systems are designed to release once a certain predetermined force is reached. Force-dependent release systems are typically formed by links that have a series of wire coils 106 with known breaking strength. One example of such a restraint system is illustrated by FIG. 8. Various links with a different number of coils can be designed to have different breaking strengths.

Many evacuation slides and/or life rafts use non-explosive, inert gas inflation systems. Similar systems are also used for life rafts. Regardless of which type of inflation system is used, it is desirable for evacuation slides and/or life rafts to inflate quickly and reliably.

The FAA currently requires evacuation of the entire aircraft in 90 seconds using 50% of the available evacuation exits. To meet this requirement, evacuation slides should deploy in less than 10 seconds, and in many instances, should deploy in less than 6 seconds.

As expected, evacuation slides and/or life raft inflatable safety devices are subjected to certain tests in order to ensure that they meet safety requirements. These tests include but are not limited to deployment at certain high wind levels and certain extreme temperatures (both cold and hot). Two of the more difficult tests to pass for an inflatable safety device are the 25 knot wind test and the −40F (if mounted on inside of the door) or −65F (if mounted outside the fuselage) cold deployment tests. Some test conditions, such as 25 knot winds, benefit from release systems with higher tensile loads. These higher tensile loads (higher breaking forces) are a detriment to other test conditions, such as cold temperature exposure. For example, at such extreme cold temperatures, inflation tends to be slower and less forceful. In order to overcome the force to break the links in these environmental conditions, more gas is required to be contained in the inflation cylinder, which adds weight to the system and requires a larger cylinder.

Accordingly, improvements to release systems used to hold evacuation slides and/or life rafts and/or any other type of inflatable safety device are desirable.

SUMMARY

The present inventors have explored force-independent ways to control the deployment sequence of inflatable evacuation systems. They determined a need for a release system that will release at a predetermined time or once a certain inflation pressure is reached, rather than at a predetermined force or unit geometry. Accordingly, there is provided one embodiment that is a release system that separates when a certain amount of time has passed after a deployment begins. The release system may be controlled by an electronic controller or may be controlled by a mechanical timer. Another embodiment provides a release system that separates when a certain inflatable pressure is achieved. This release system may be controlled by a controller connected to a pressure switch on the inflatable safety device or may be controlled by a pneumatic pressure switch connected to the inflatable safety device.

In one example, there is provided a force-independent release system for an inflatable safety device, the system comprising: a releasable link that releases upon a predetermined time after deployment begins or once a certain inflation pressure of the inflatable safety device is reached, or any combination thereof.

In the above or any subsequent example, the releasable link is controlled by a timer switch.

In any of the above or any subsequent examples, the timer switch communicates with an inflation system, and wherein, once a predetermined time has been reached, the releasable link is released.

In any of the above or any subsequent examples, the releasable link is controlled by a pressure switch or a pneumatic switch on the inflatable safety device.

In any of the above or any subsequent examples, the pressure switch or pneumatic switch communicates with an inflation system, and wherein, once a predetermined pressure has been reached, the releasable link is released.

In any of the above or any subsequent examples, the releasable link is in cooperation with a holding strap, the holding strap configured to secure the inflatable safety device in a bundled configuration.

In any of the above or any subsequent examples, the releasable link comprises a cutting pin.

In any of the above or any subsequent examples, the cutting pin is released from a first retracted position via activation, the cutting pin extends to a second cutting position and severs a link body.

In any of the above or any subsequent examples, the releasable link comprises a release pin.

In any of the above or any subsequent examples, the release pin is retracted from a first extended position via activation, the release pin releases first and second portions of the releasable link.

In any of the above or any subsequent examples, an extended pin position of the release pin secures first and second members of the releasable link to one another, wherein at least one of the first and second members is secured to a holding strap, wherein when the release pin is released by activation, the release pin retracts to a second release position and allows separation between the first and second members.

In any of the above or any subsequent examples, the releasable link comprises a releasable hook.

In any of the above or any subsequent examples, the releasable hook further comprises a hook body, a pivotable hook arm, and a pin, wherein an extended pin position of the pin secures the hook body and the pivotable hook arm to one another, wherein when the pin is released by activation, the pin retracts to a second release position and allows separation between the hook body and the pivotable hook arm.

In any of the above or any subsequent examples, there is further provided a redundant back-up release system.

In any of the above or any subsequent examples, there is also provided a method for deploying an inflatable safety device using a force-independent release system, the method comprising: providing any examples of the disclosed force-independent release system, detecting a determined set passage of time or a determined set inflation pressure, sending information about the detected passage of time or the determined inflation pressure to a controller that causes release of the force-independent releasable link system.

In any of the above or any subsequent examples, there is also provided a method for deploying an inflatable safety device using a force-independent release system, the method comprising: providing any examples of the disclosed force-independent release system, wherein once a determined set passage of time or a determined set inflation pressure is reached, a mechanical timer or mechanical pressure switch releases the force-independent releasable link system.

The terms “invention,” “the invention,” “this invention” “the present invention,” “disclosure,” “the disclosure,” and “the present disclosure,” used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

DETAILED DESCRIPTION

Although this disclosure is described primarily in connection with aircraft evacuation slides, it should be understood that the release systems described herein are usable in connection with any other type of inflatable safety device, such as evacuation slides, evacuation slide/rafts, life rafts, emergency floats, emergency flotation systems, life preservers, inflatable/decontamination shelters, inflatable/shelters, inflatable/military shelters, aviation life rafts, marine life rafts, ship decoys and inflatable military targets, space applications of the aforementioned, or any combination thereof.

Release systems control the deployment sequence and trajectory of an inflatable safety device, such as an inflatable slide, slide/raft, or life raft. Most existing release systems typically function by remaining intact until a certain tensile load is exceeded. However, slide testing requirements at certain wind and temperature conditions can render this tensile load or specific force limitation to be challenging to meet, because release systems that only break at higher tensile loads typically require more inflation gas to be delivered at extreme cold temperatures than is otherwise necessary at more common temperature/use conditions. Nonetheless, that higher amount of inflation gas is required to be carried on board the aircraft so that activation will occur appropriately at the extreme testing conditions.

The present disclosure thus solves this technical problem by providing a frangible release system that is separated by a way other than force, eliminating the need for a certain tensile breaking force to be met to cause a release system to separate. The disclosure provides a force-independent releasable system.

Figure 1:
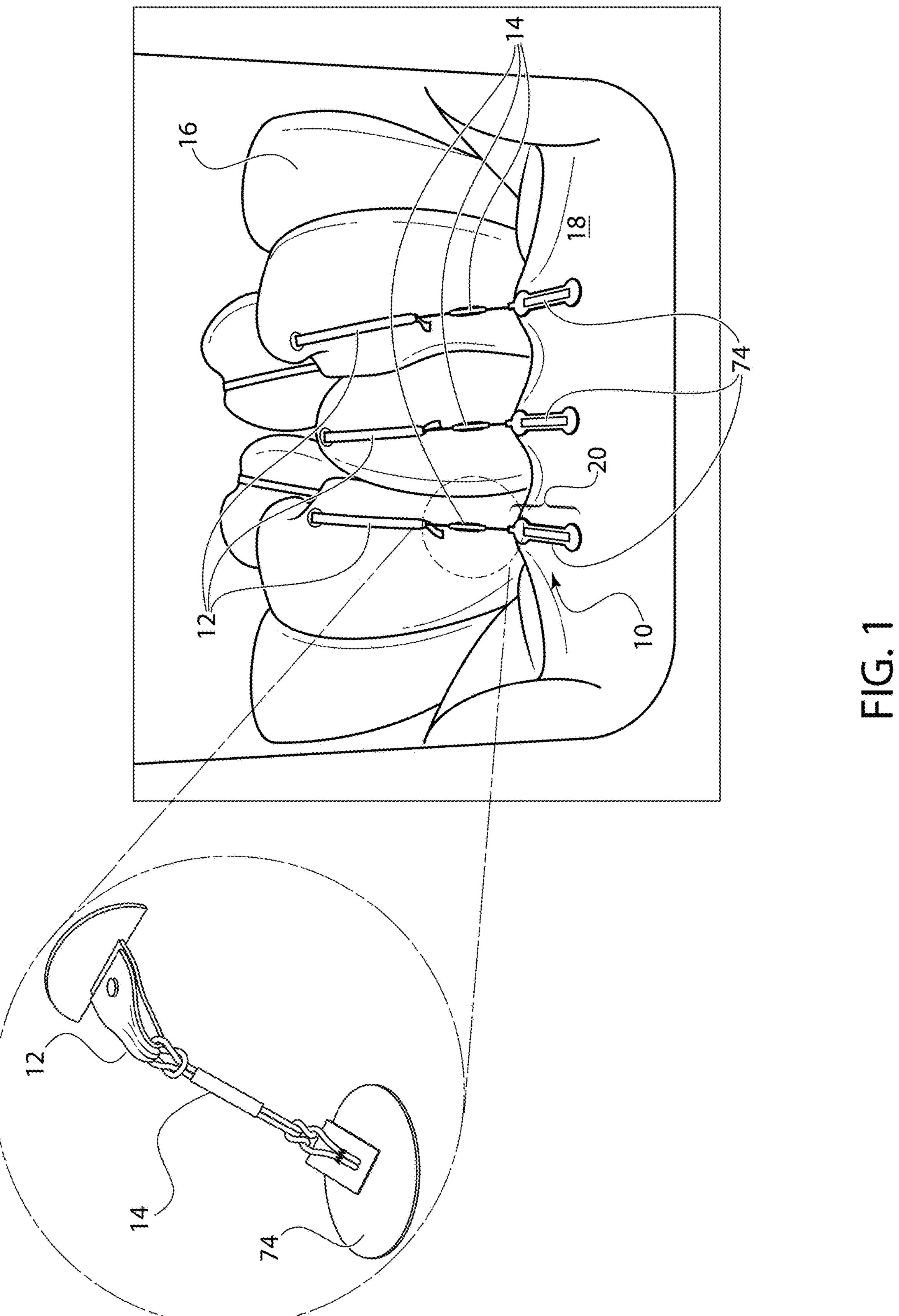
FIG. 1 is a top perspective view of an inflatable safety device in a bundled configuration held in place by a plurality of release systems.

As shown by FIG. 1, the release system 10 incorporates one or more holding straps 12 and one or more releasable links 14. In the embodiment shown, a plurality of intermediate links 74 or loops may be secured to an aircraft slide 16 at a girt area 18 near the slide entrance. One end of a releasable link 14 is secured to a free end of the intermediate link 74. The other end of the releasable link 14 is secured to an end of a holding strap 12. When the slide 16 is folded as illustrated, cooperation between the holding strap 12 and the releasable link 14 maintain the aircraft slide in a bundled configuration.

One embodiment of a releasable link 14 is configured to separate when a certain amount of time has passed after a deployment begins. Another embodiment provides a releasable link 14 that separates when a certain inflatable pressure is achieved. A further version of a releasable link 14 may incorporate a combination of these two features. A further version of a releasable link 14 may include a redundant backup system 26. (It should be understood that this redundant backup system 26 may be a force-dependent system using a series of wound coils as described above, may be a geometric restraint as described above, or any other appropriate type of backup system available.)

The release system 10 may be controlled by an electric controller connected to a pressure switch or a timer on the inflatable safety device. The release system 10 may be controlled mechanically by a pneumatic switch or a mechanical timer connected to the inflatable safety device.

As illustrated by FIG. 2, the releasable link 14 may incorporate a body 20 with a first end 28 that is attached to an intermediate link that is secured to a slide surface. The link 14 is shown having a second end 30 that is configured to cooperate with an end of a holding strap. However, it is possible for the link 14 to be positioned such that it directly contacts the slide.

Figure 2A:
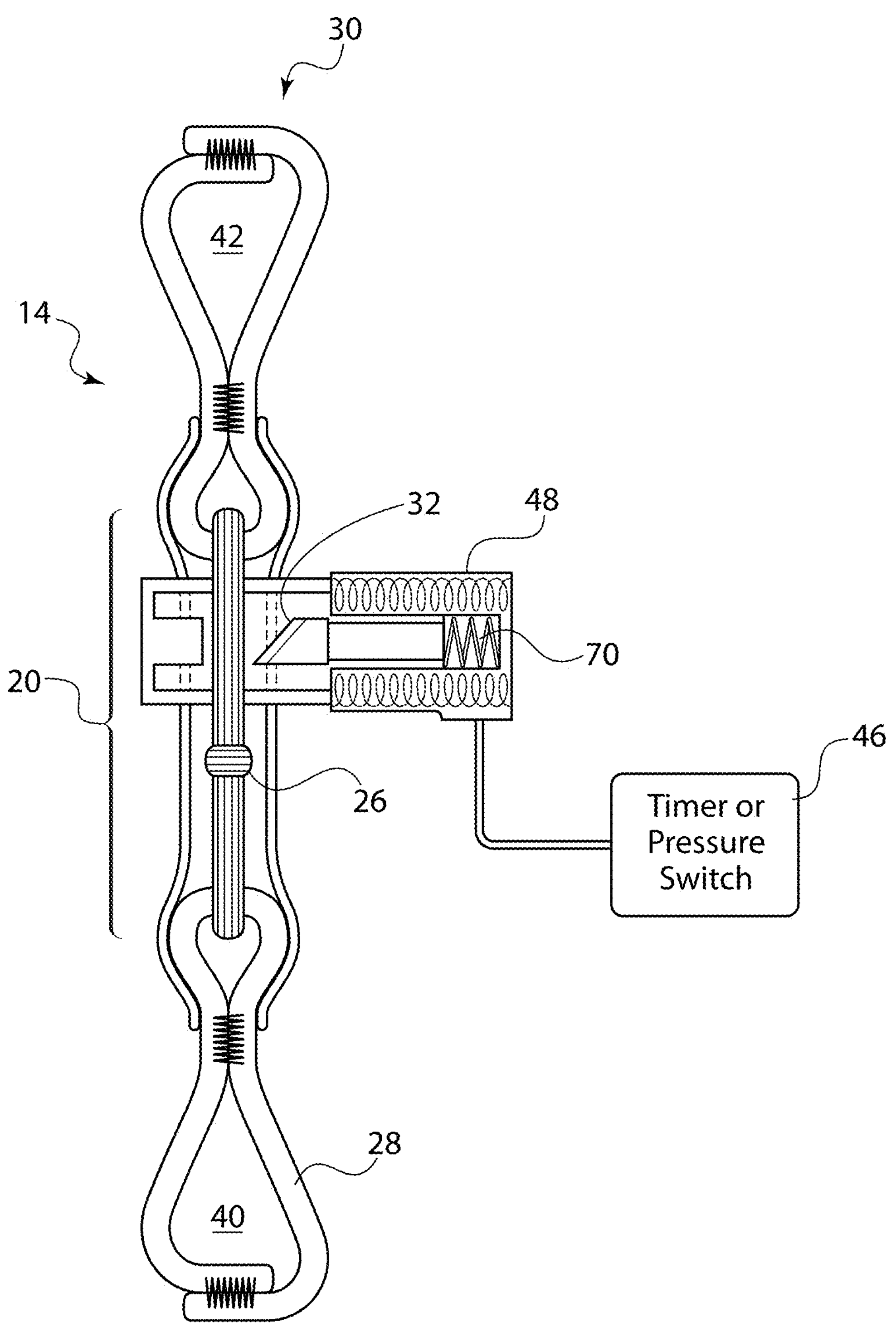
FIG. 2A is a side cross sectional view of one embodiment of a release system that uses a cutting pin.
Figure 2B:
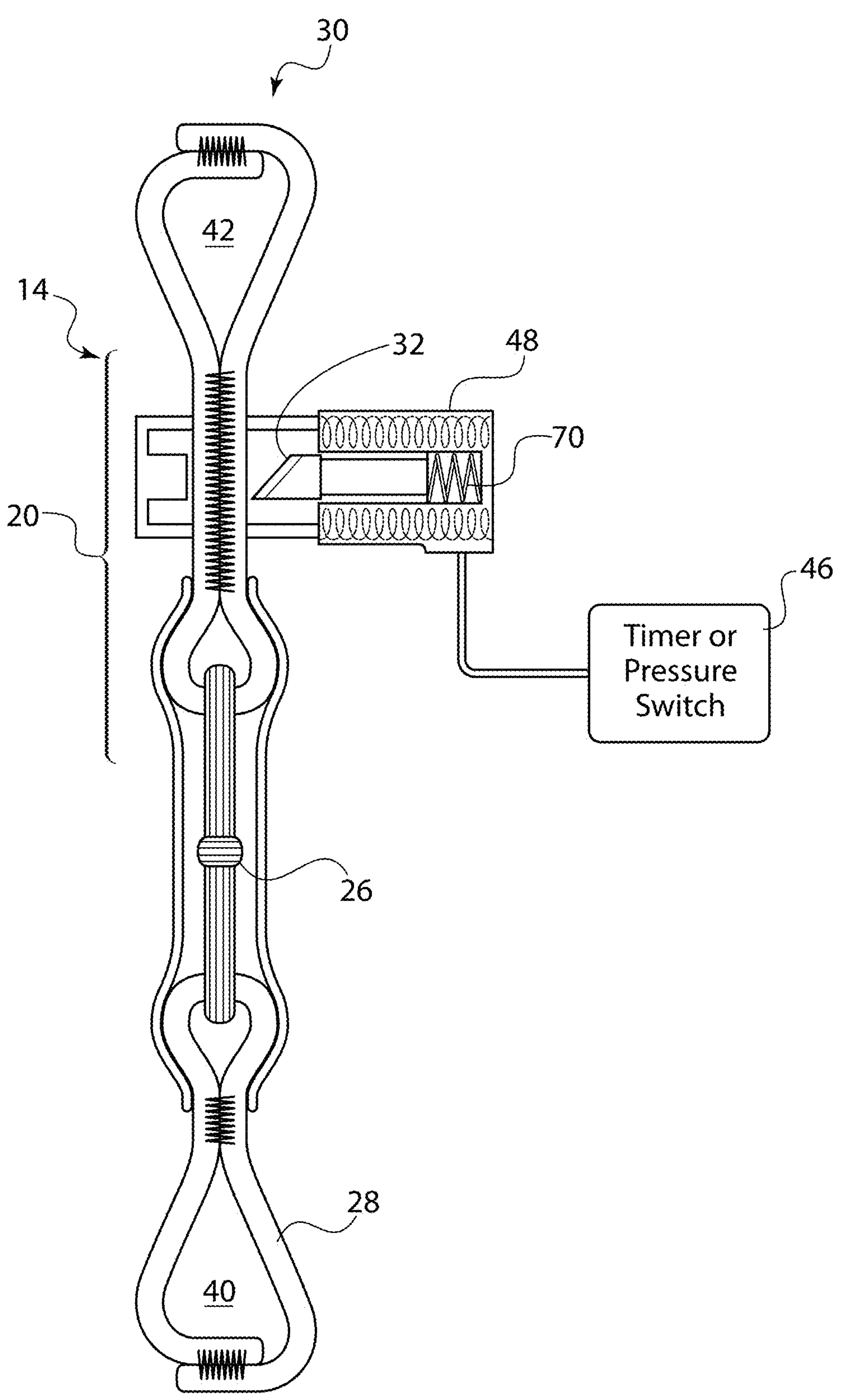
FIG. 2B is a side cross sectional view of another embodiment of a release system that uses a cutting pin.
Figure 2C:
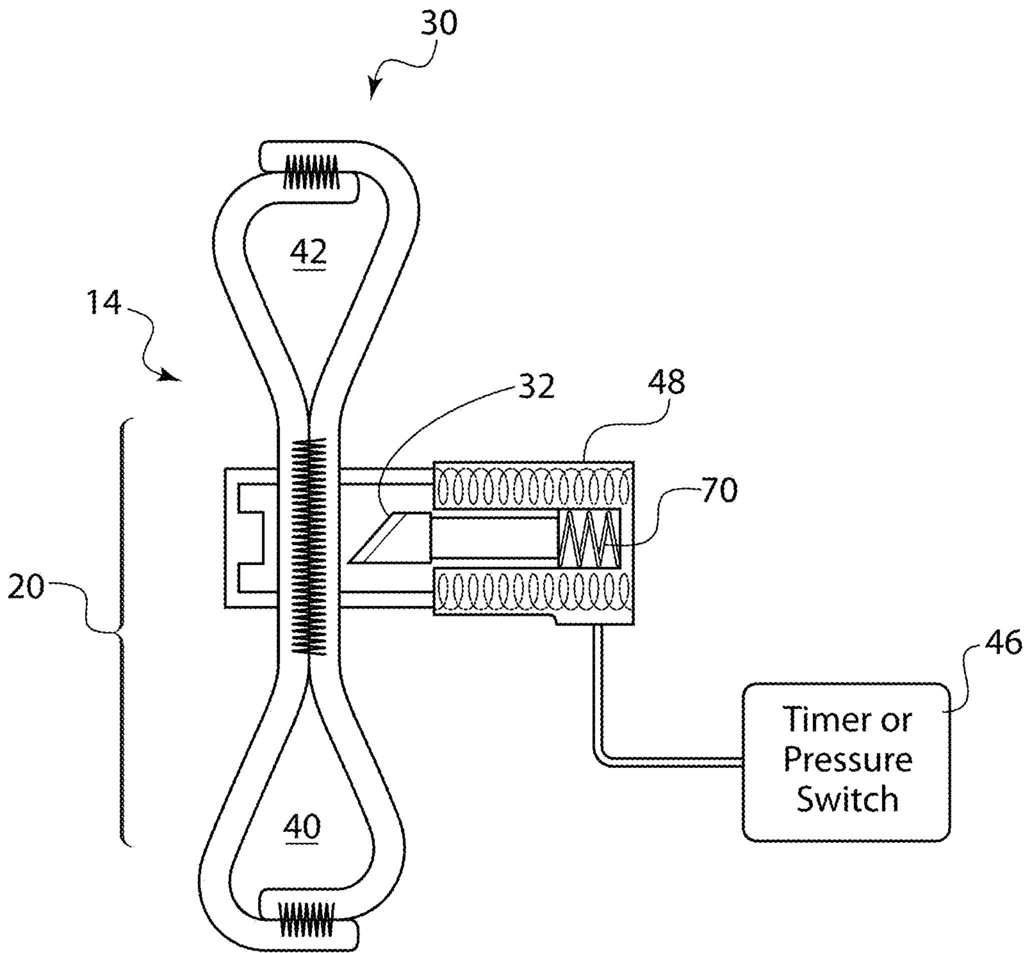
FIG. 2C is a side cross sectional view of a release system that uses a cutting pin without a redundant back up system.
Figure 3A:
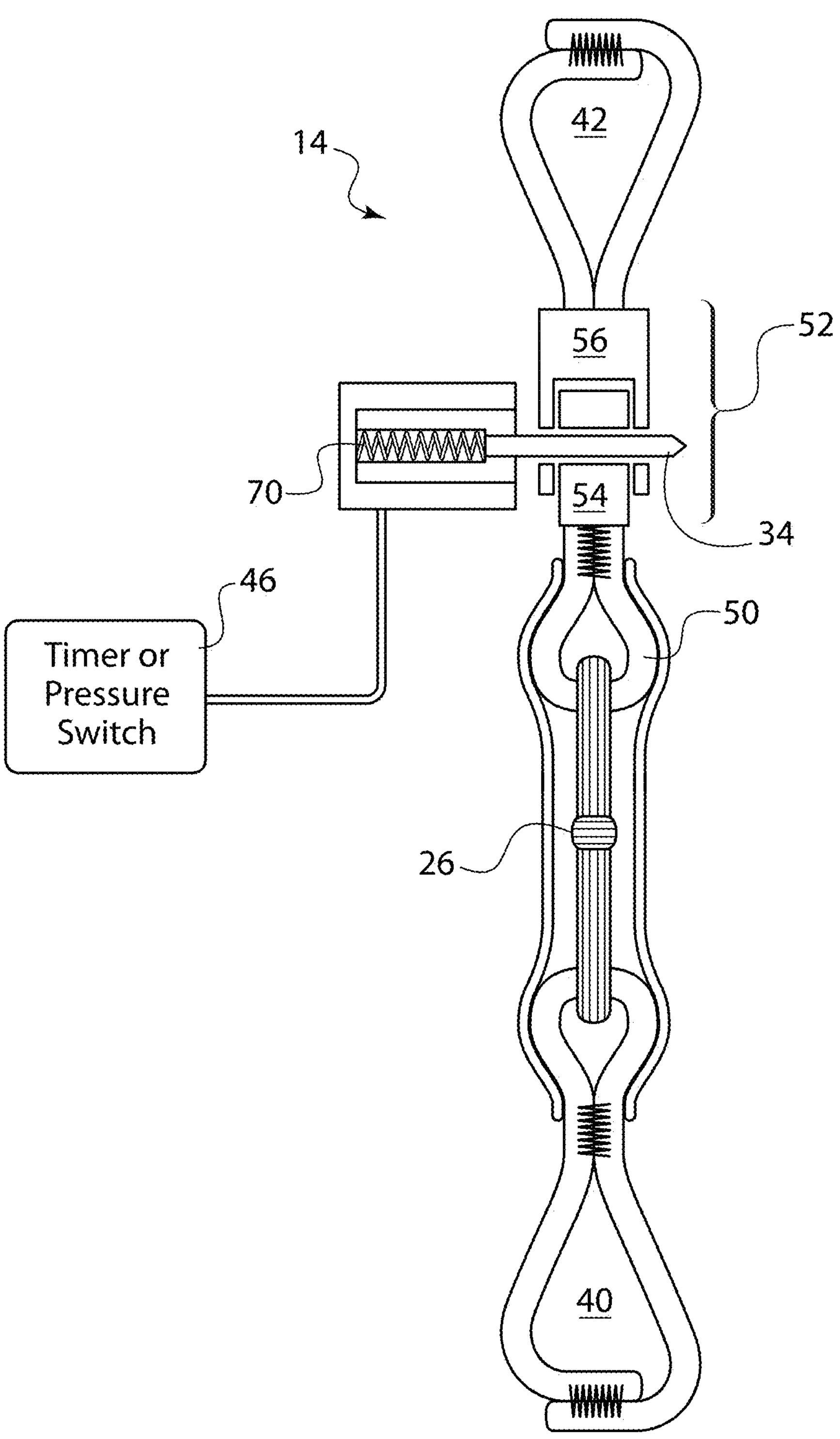
FIG. 3A is a side cross sectional view of one embodiment of a release system that uses a releasable pin.
Figure 3B:
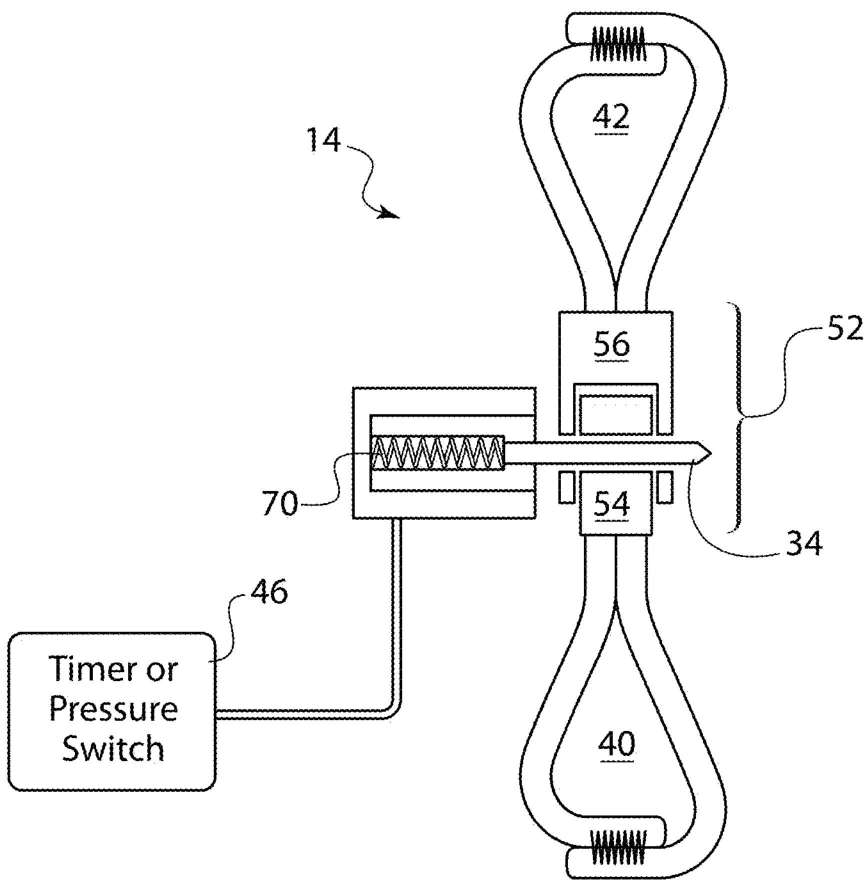
FIG. 3B is a side cross sectional view of a release system that uses a releasable pin without a redundant back up system.
Figure 4A:
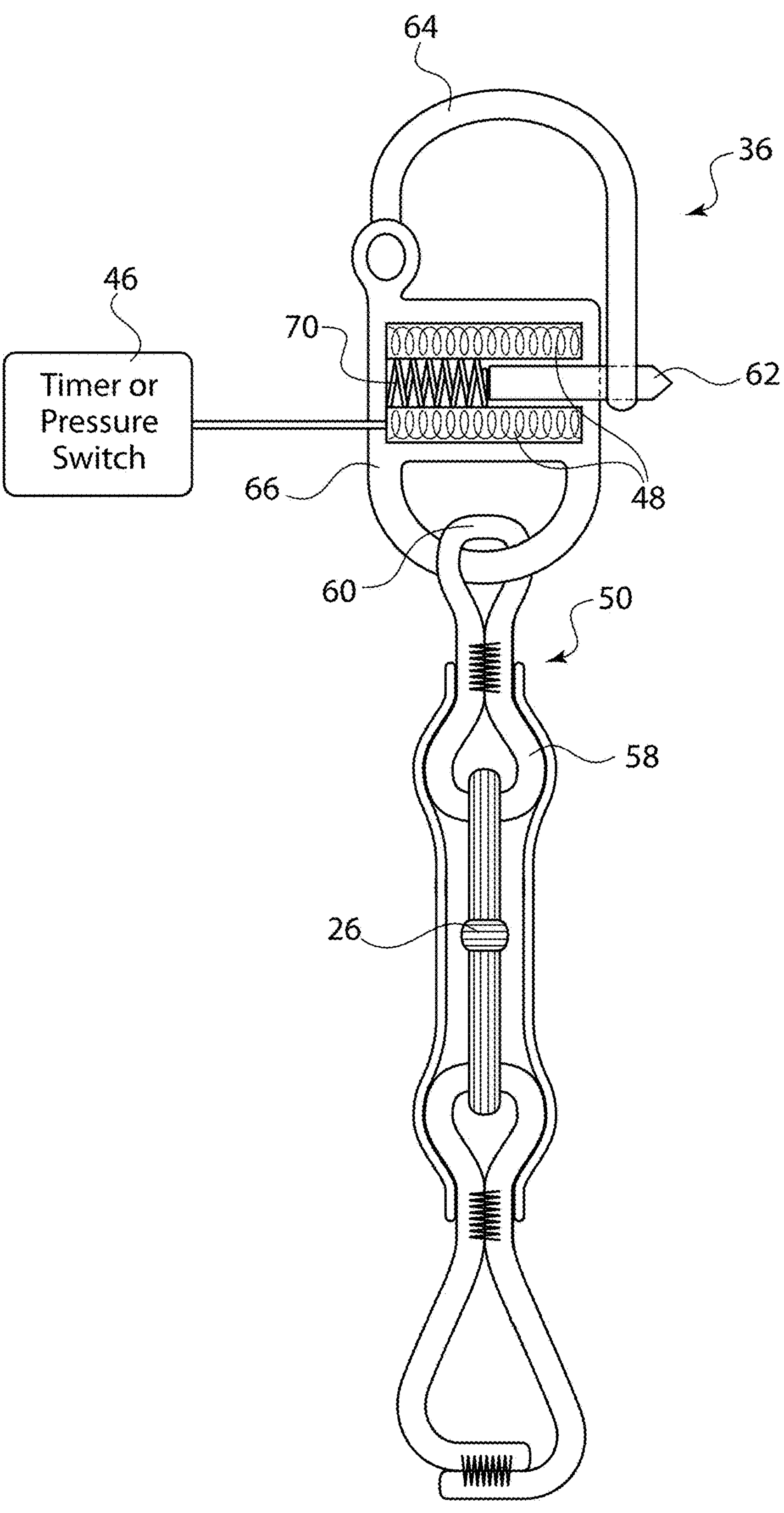
FIG. 4A is a side cross sectional view of one embodiment of a release system that uses a releasable hook.
Figure 4B:
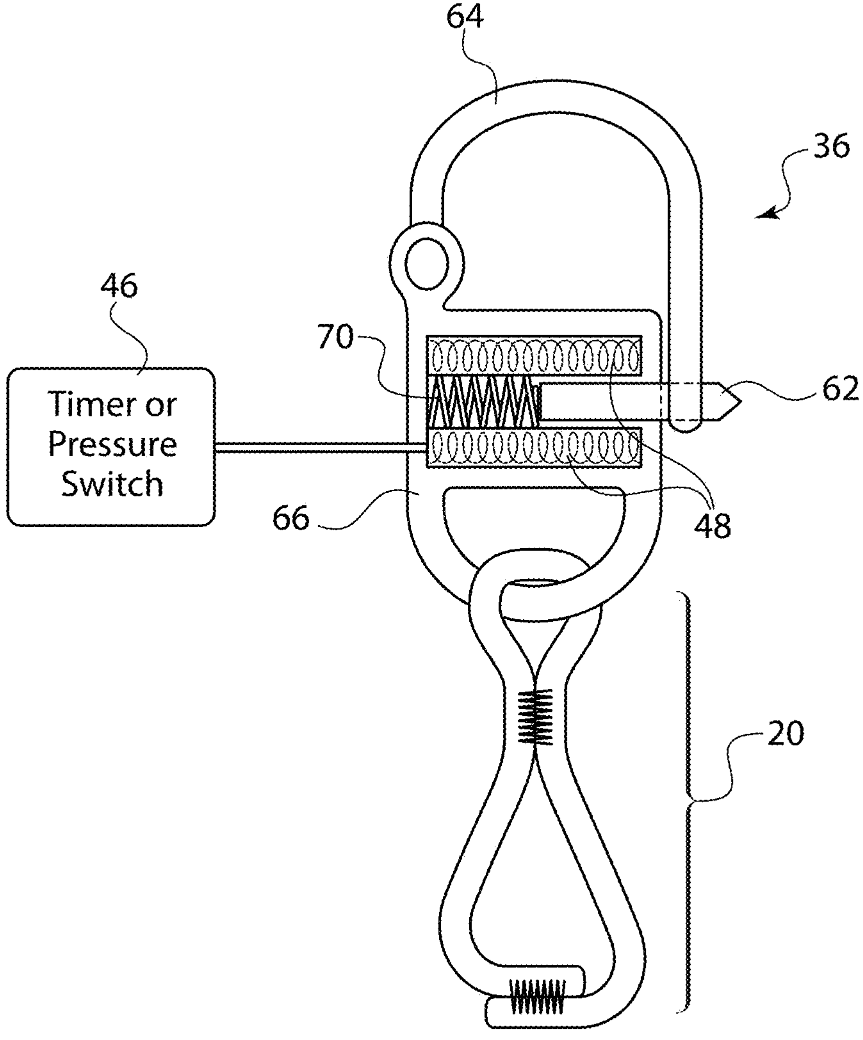
FIG. 4B is a side cross sectional view of a release system that uses a releasable hook without a redundant back up system.

The link ends 28, 30 may be formed as cords that are stitched or intertwined with one another. The link body 20 may incorporate a redundant backup system 26. (In the illustrated examples, the redundant back-up system 26 may be a series of coils with differing breaking strengths, but any type of alternate redundant system can be incorporated with the disclosed release system.) In one embodiment, release of the link second end 30 (the end that cooperates with the holding strap 12) may be accomplished via a cutting pin 32, as shown by FIGS. 2A-2C. Release of the link second end 30 may be accomplished via a release pin 34, as shown by FIGS. 3A-3B. Release of the link second end 30 may be accomplished via a releasable hook 36, as shown by FIGS. 4A-4B. Other release options or systems are possible and considered within the scope of this disclosure. These release options or systems may be controlled by a controller, a solenoid coil, a mechanical timer, a pressure switch, a pneumatic switch, other pressure-tracking or time-tracking systems, or any combination thereof.

If release of the release system is controlled by a timer or is otherwise designed to be time-dependent, the timer option may be controlled via an electric timer with a microcontroller. In one example, the timer can send input to a controller that activates a solenoid. In another example, the release of the system may be controlled by a mechanical timer or any other appropriate time-tracking system.

If release of the release system is controlled by a pressure switch or is otherwise designed to be pressure-dependent, the pressure option may be controlled via a controller that communicates with a pressure switch or a pressure transducer. In another example, the release of the system may be controlled by a mechanical pressure switch, a pneumatic pressure switch, or any other appropriate pressure-tracking system.

In one example, as shown by FIGS. 2A-2C, the release system ends 28, 30 may include first and second loops 40, 42. Although shown as loops, it should be understood that any appropriate connection feature may be used at the release system ends 28, 30 and is considered within the scope of this disclosure. The loops 40, 42 that are shown may be connected to the slide via any appropriate means, such as connection to an intermediate link/loop, a holding strap, or any other appropriate structure. The body 20 of the releasable link 14 is positioned between the loops 40, 42. As described above, it is possible to have a backup/redundant release system 26 incorporated into the release system 10, as shown by FIGS. 2A and 2B. In these examples, the redundant release system 26 is provided as a wire coil. It should be understood, however, that alternate backup systems 26 are possible for use. As shown by FIG. 2C, a redundant system 26 is not required. In this embodiment, the cutting pin feature 32 can be positioned along the link body 20.

The primary release system in FIGS. 2A-2C is a cutting pin 32. Activation of the cutting pin 32 releases it from its first (retracted) position to its second (cutting) position in order to lacerate the link body 20. Spring 70 can force the cutting pin 32 forward, once released. FIG. 2A shows the cutting pin 32 cutting through the redundant wire coil 26. FIG. 2B shows the cutting pin 32 cutting through the material of the link loop 42. FIG. 2C shows a link body 20 and a cutting pin 32, without incorporating the optional redundant back-up system.

Activation of the cutting pin 32 may occur via various sequences or events. In one example, a timer or pressure switch 46 receives an input from the inflation system of the inflatable safety device. The inflation system may communicate to the switch 46 that a specific time has elapsed since it has been activated (e.g., 1-3 seconds or that a specific inflation pressure has been reached (e.g., 1.5-2.5 psi). It should be understood that any time or pressure limitation is dependent upon the size of the slide to be inflated; different slides require different times for inflation; different slides require different inflation pressures for inflation.

The timer or pressure switch 46 can either communicate with a controller that activates an actuator 48 (e.g., such as a solenoid or a series of solenoid coils) to cause movement of the cutting pin 32 from its first position (retracted, as shown by FIG. 2) to its second, cutting position. In alternate embodiments, the timer or pressure switch 46 may be mechanical and may operate without a controller. A certain set pressure or set time can cause activation of the release system. Various examples of these activation options are shown in FIGS. 5A-5D, described further below.

In another example, as shown by FIGS. 3A-3B, the release system may include similar features as described above, with the primary release system being a release pin 34. As shown by FIG. 3A, the link body in this embodiment may incorporate a third loop 50 that may be secured to the redundant backup system 26. Between the third loop 50 and the second loop 42 is a pin-held feature 52. Pin-held feature 52 has a first member 54 secured to the third loop 50, and a second member 56 secured to the second loop 42. When release pin 34 is in its first extended/securing position, it holds the first and second members 54, 56 in secure connection to one another. Activation of the release pin 34 releases it from its first position, where it is extended in a securing position to a second retracted/release position. This activation/release can be managed via a spring 70. This second retracted/release position occurs when the release pin 34 is pulled or otherwise released, which causes first member and second members 52, 54, to release from one another. This releases the holding strap 12 that is connected to the second loop 42. As shown by FIG. 3B, a redundant system 26 is not required. In this embodiment, the pin-held feature 52 is positioned between first and second loops 40, 42.

Activation of the release pin 34 may occur via various sequences or events. In one example, a timer or pressure switch 46 receives an input from the inflation system of the inflatable safety device. The inflation system may communicate to the switch 46 that a specific time has elapsed since it has been activated (e.g., 1-3 seconds or that a specific inflation pressure has been reached (e.g., 1.5-2.5 psi). It should be understood that any time or pressure limitation is dependent upon the size of the slide to be inflated; different slides require different times for inflation; different slides require different inflation pressures for inflation. Various examples of these activation options are shown in FIGS. 5A-5D, described further below.

In a further example, as shown by FIGS. 4A-4B, the release system may include similar features as described above, with the primary release system being a releasable hook 36. As shown by FIG. 4A, the link body in this embodiment may also incorporate a third loop 50 with first and second connectors 58, 60. The first connector 58 may be secured to a redundant backup system 26. The second connector 60 may be secured to the releasable hook 36. As shown by FIG. 4B, redundant system 26 is not required. In this embodiment, the releasable hook 36 is positioned at one end of the link body 20.

Releasable hook 36 may be provided with various configurations. It should be understood that the configuration illustrated by FIGS. 4A-4B is for exemplary purposes only. In this example, the releasable hook 36 is secured in place via a pin 62 that secures a pivotable hook arm 64 to a hook body 66. Activation/release of the pin 62 can be managed via a spring 70. Activation of the pin 62 releases it from its first (extended/securing) position to a second retracted/release position. This second release position pulls or otherwise releases the pin 62, which causes the pivotable hook arm 64 to release from the hook body 66. The holding strap 12 is secured to the releasable hook 36 via the pivotable hook arm 64. When the arm 64 is released, this also causes release of the holding strap 12.

Activation of the pin 62 may occur via various sequences or events. In one example, a timer or pressure switch 46 receives an input from the inflation system of the inflatable safety device. The inflation system may communicate to the switch 46 that a specific time has elapsed since it has been activated (e.g., 1-3 seconds or that a specific inflation pressure has been reached (e.g., 1.5-2.5 psi). It should be understood that any time or pressure limitation is dependent upon the size of the slide to be inflated; different slides require different times for inflation; different slides require different inflation pressures for inflation. Various examples of these activation options are shown in FIGS. 5A-5D, described further below.

Communication between the inflation system of the inflatable safety device, the timer or pressure switch 46, and an optional controller is illustrated by the schematics of FIGS. 5A-5D. In a first example shown by FIG. 5A, pressure of the inflatable safety device is sensed via a pressure transducer or pressure switch 46. The transducer/switch measures the pressure, and when the pressure reaches a certain set point, a controller can receive input from the transducer/switch that the pressure has reached the certain set point. The controller can instruct the solenoid 48 to power up, which releases the releasable link 14 (in any of the ways described above). In some cases, it is possible to use a pressure switch (that integrates a transducer and pressure switch in one).

Figure 5A:
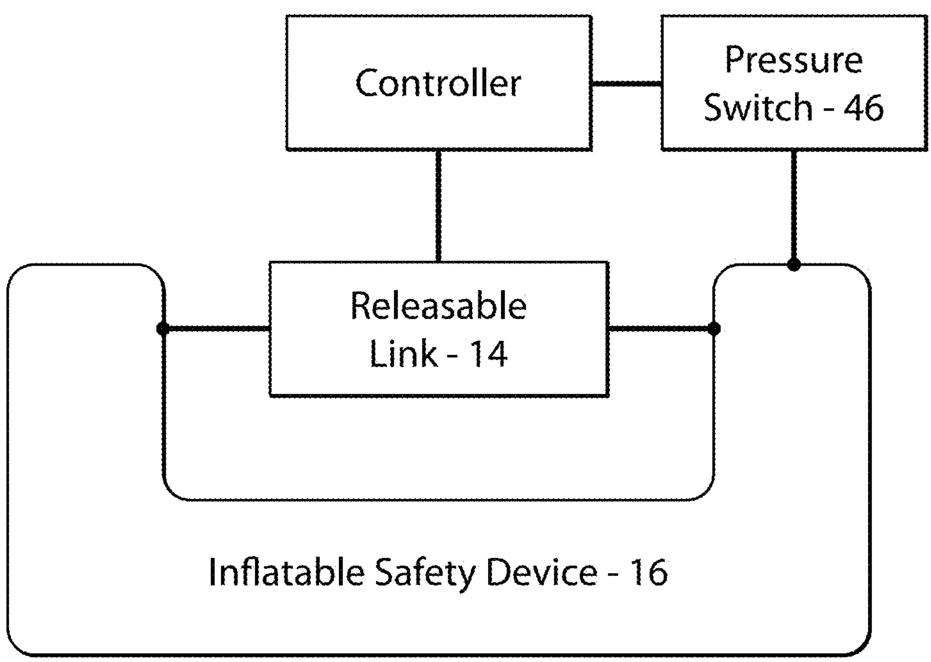
FIG. 5A is a schematic illustrating communication between an inflatable safety device and a controller and pressure switch that coordinate release of a releasable link.
Figure 5B:
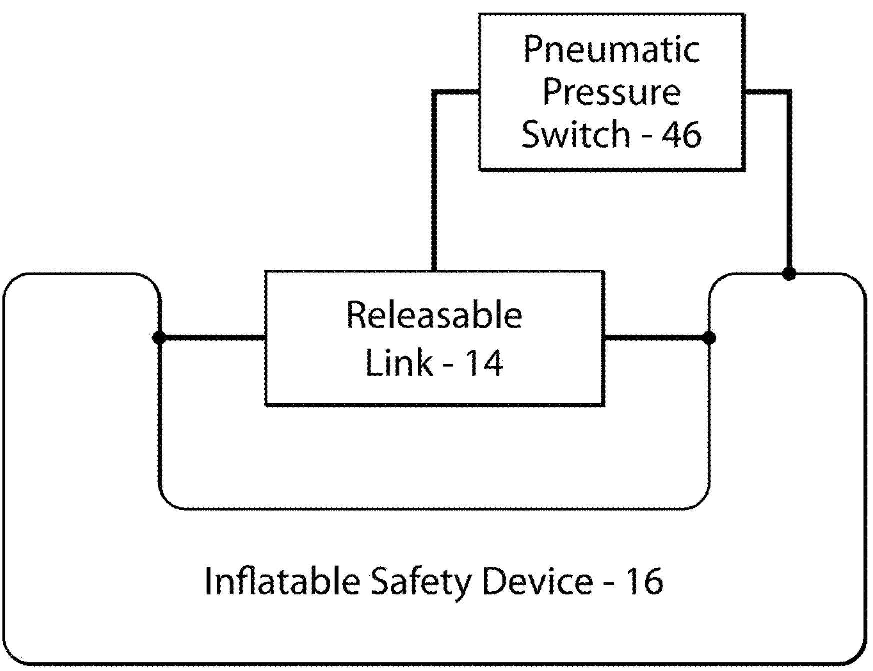
FIG. 5B is a schematic illustrating communication between an inflatable safety device and a pneumatic pressure switch to coordinate release of a releasable link.

In another option illustrated by FIG. 5B, a pneumatic or mechanical pressure switch may be used, which mechanically actuates the releasable link 14.

Figure 5C:
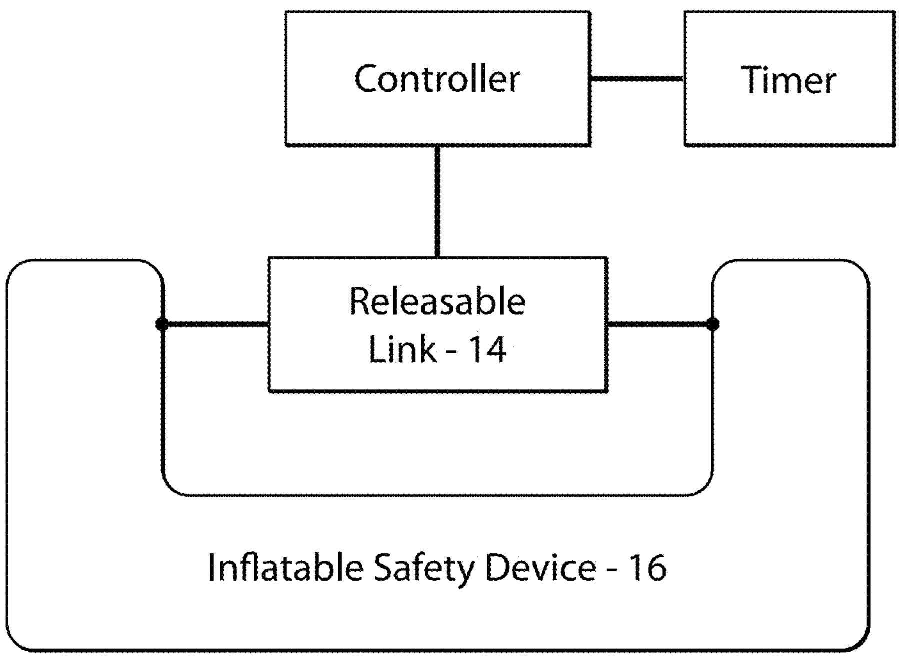
FIG. 5C is a schematic illustrating communication between an inflatable safety device and a controller and timer to coordinate release of a releasable link.
Figure 5D:
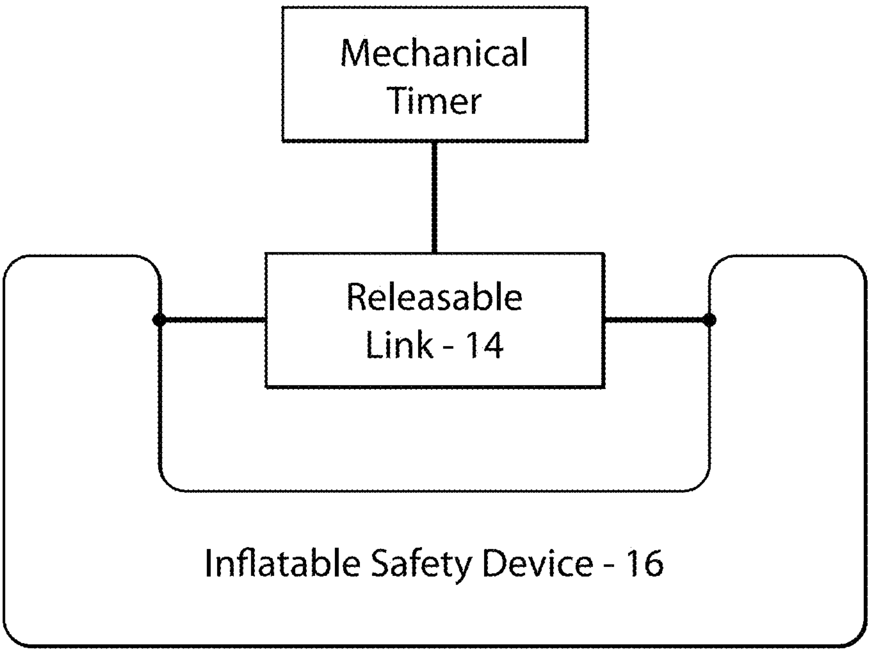
FIG. 5D is a schematic illustrating communication between an inflatable safety device and a mechanical timer to coordinate release of a releasable link.

In a further option, a timer (which may be used with a controller 48, as shown by FIG. 5C or which may be used without a controller such that the timer is mechanical, as shown by FIG. 5D) receives input regarding a certain start time (e.g., start of inflation, the fact that a door has opened). As shown by FIG. 5C, once the timer reaches a certain set level of time, a controller sends a signal to the system to release the releasable link 14. In an alternate embodiment as shown by FIG. 5D, once the mechanical timer reaches a certain set level of time, the releasable link 14 is released.

Figure 6:
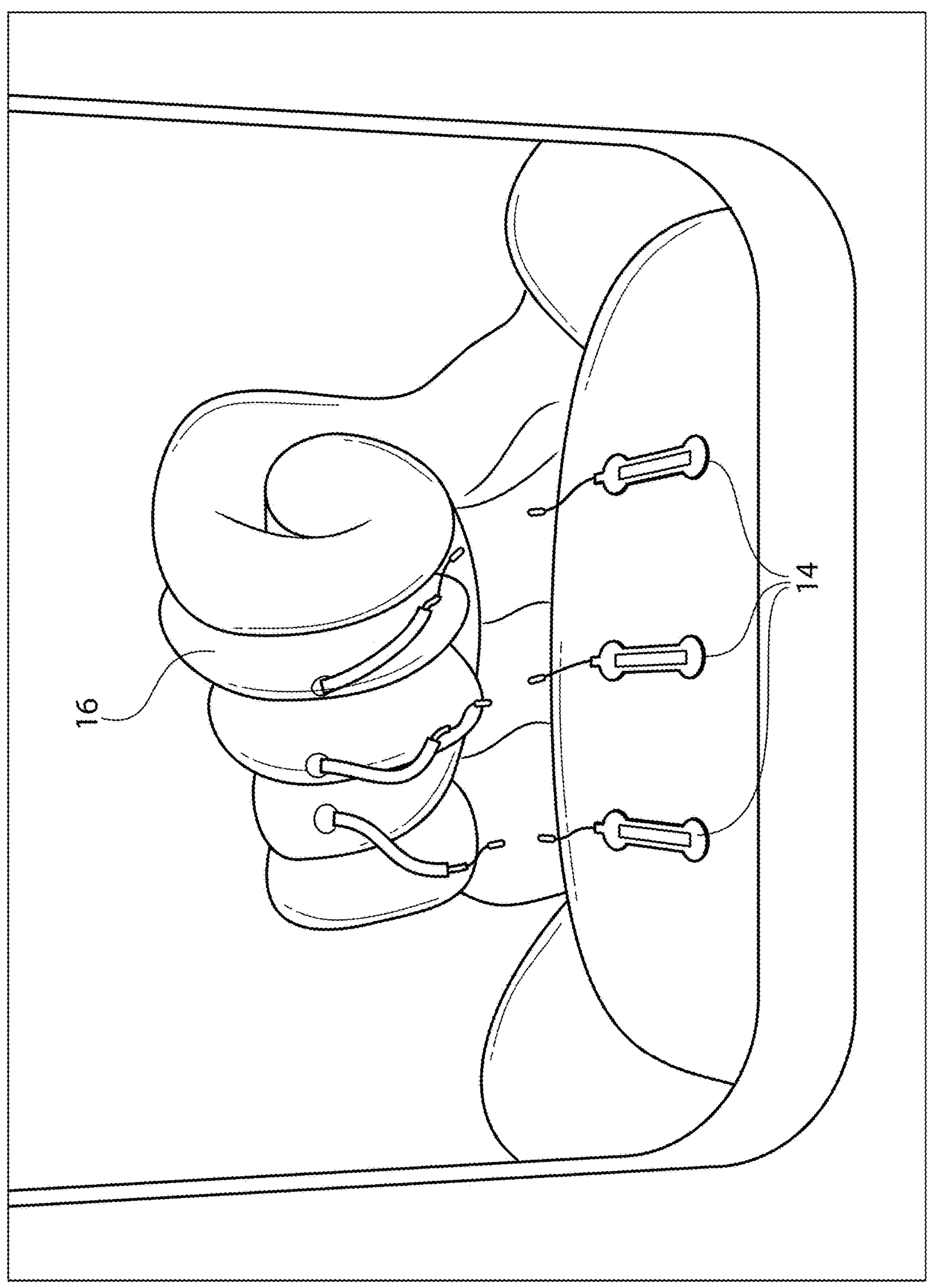
FIG. 6 shows a top perspective view of the inflatable safety device of FIG. 1 with the release systems released.
Figure 7A:
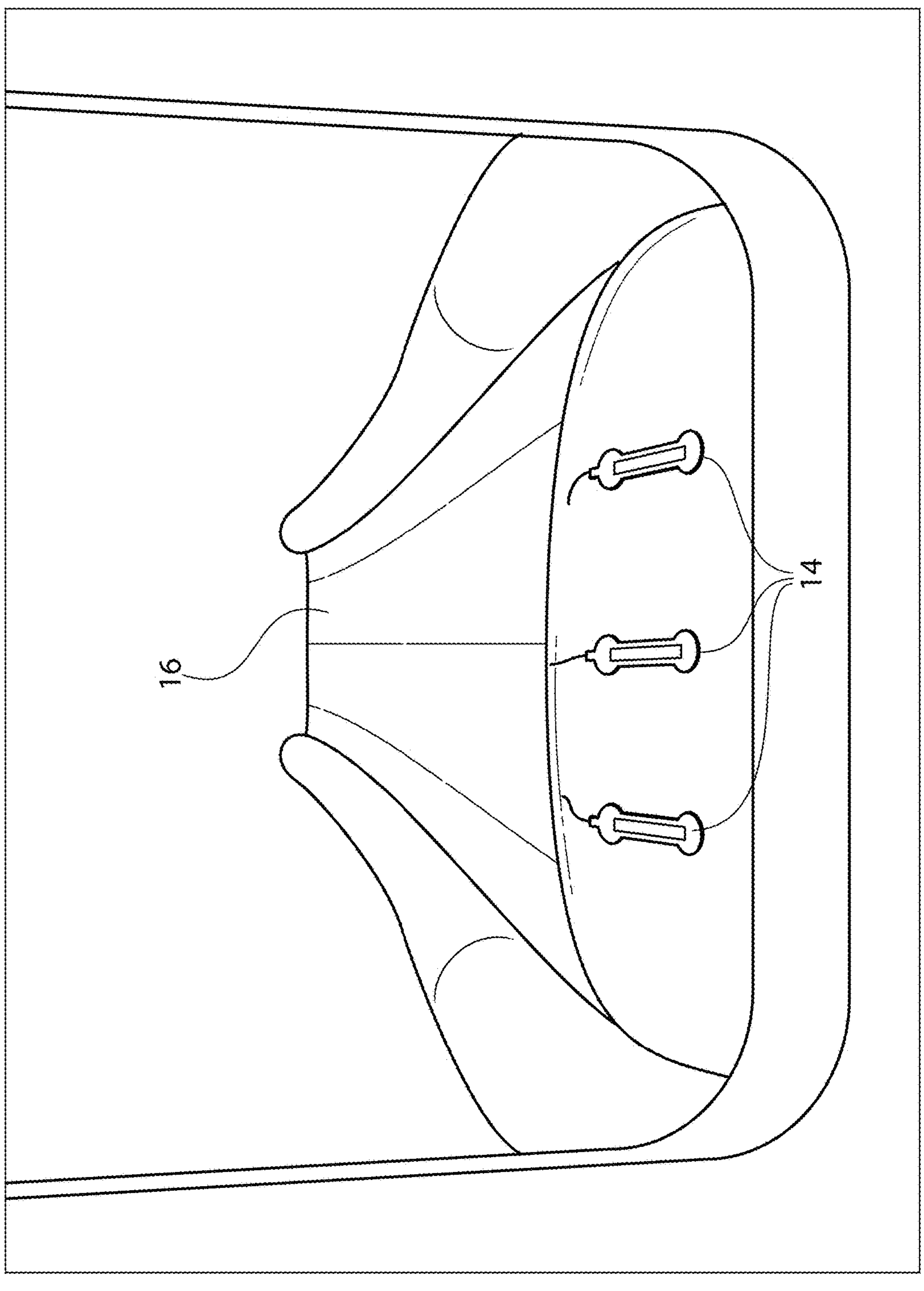
FIG. 7A shows a top perspective view of the slide of FIG. 6 in a fully deployed position.
Figure 7B:
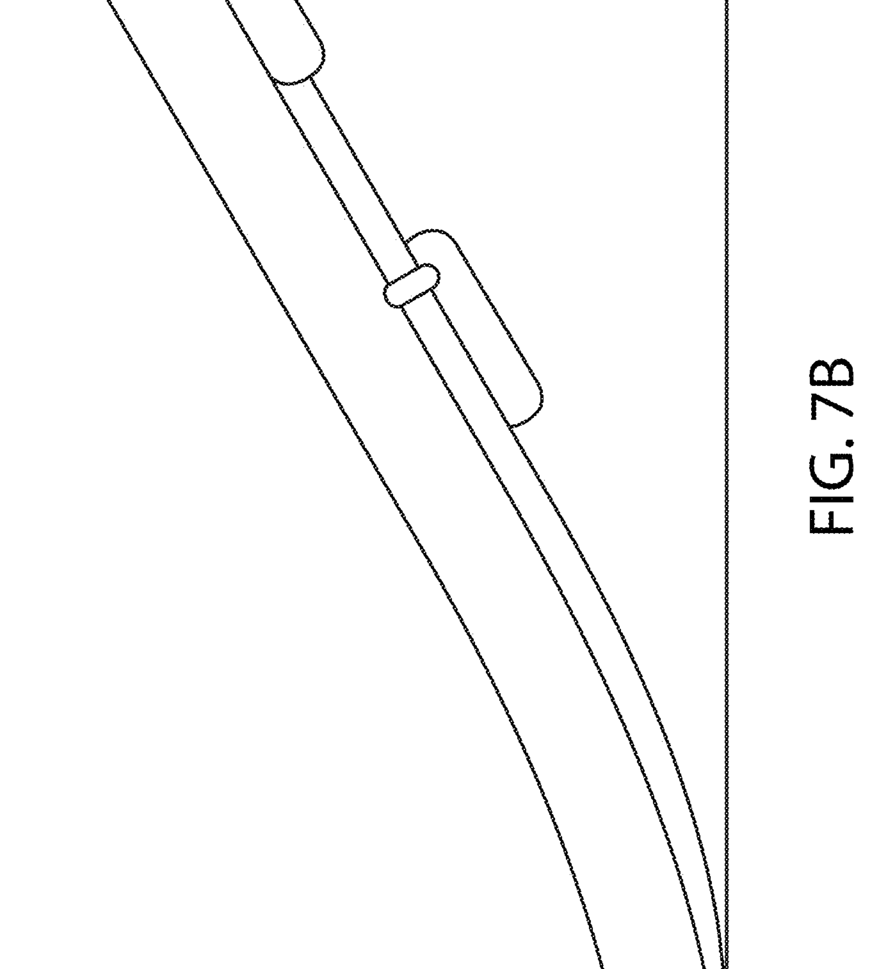
FIG. 7B shows a side perspective view of the slide of FIG. 7A.
Figure 8:
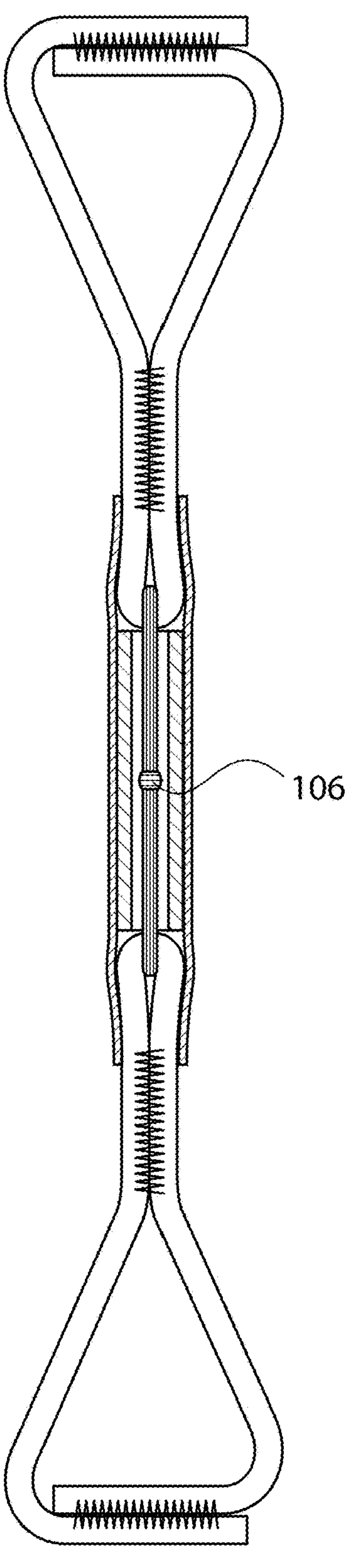
FIG. 8 illustrates a section view of a prior art frangible link.

As shown by FIG. 6, the releasable link 14 holds the inflatable safety device 16 (which may be a slide, a slide/raft, or a life raft) in a bundled configuration. Once the releasable link 14 is released, FIG. 6 illustrates an inflatable safety device 16 (shown as an evacuation slide) during inflation, after release of a first set of releasable links 14. It should be understood that a plurality of releaseable links may be provided along various portions of the slide or slide/raft so that different portions release at different pressure intervals or time intervals. FIG. 7A illustrates a completely deployed slide 16 with a first set of links 14 shown after being released. FIG. 7B illustrates a side view of the deployed slide of FIG. 7A.

Improvements of the invention described by this disclosure include:

(1) Reduction in overall system weight and pack volume. This is achieved because less gas will be needed to successfully pass the cold test requirements. Less gas may allow for a smaller volume reservoir size. Less gas and a smaller reservoir will reduce the weight and pack volume of a system.

(2) Reduction of carbon footprint due to a reduction of system weight.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A force-independent release system for an inflatable safety device, the system comprising:

a frangible link that releases upon a predetermined time after deployment begins or once a certain inflation pressure of the inflatable safety device is reached, or any combination thereof; and characterized in that the frangible link is controlled by at least one switch selected from the group consisting of a timer switch, a pressure switch, and a pneumatic switch on the inflatable safety device.

2. The system of claim 1, wherein the frangible link is controlled by a timer switch.

3. The system of claim 1, wherein the timer switch communicates with an inflation system, and wherein, once a predetermined time has been reached, the frangible link is released.

4. The system of claim 1, wherein the frangible link is controlled by a pressure switch or a pneumatic switch on the inflatable safety device.

5. The system of claim 1, wherein the pressure switch or pneumatic switch communicates with an inflation system, and wherein, once a predetermined pressure has been reached, the frangible link is released.

6. The system of claim 1, wherein the frangible link is in cooperation with a holding strap, the holding strap configured to secure the inflatable safety device in a bundled configuration.

7. The system of claim 1, wherein the frangible link comprises a cutting pin.

8. The system of claim 7, wherein when the cutting pin is released from a first retracted position via activation, the cutting pin extends to a second cutting position and severs a link body.

9. The system of claim 1, wherein the frangible link comprises a release pin.

10. The system of claim 9, wherein when the release pin is retracted from a first extended position via activation, the release pin releases first and second portions of the frangible link.

11. The system of claim 9, wherein an extended pin position of the release pin secures first and second members of the releasable link to one another, wherein at least one of the first and second members is secured to a holding strap, wherein when the release pin is released by activation, the release pin retracts to a second release position and allows separation between the first and second members.

12. The system of claim 1, wherein the frangible link comprises a releasable hook.

13. The system of claim 12, wherein the releasable hook further comprises a hook body, a pivotable hook arm, and a pin, wherein an extended pin position of the pin secures the hook body and the pivotable hook arm to one another, wherein when the pin is released by activation, the pin retracts to a second release position and allows separation between the hook body and the pivotable hook arm.

14. The system of claim 1, further comprising a redundant back-up release system.

15. A method for deploying an inflatable safety device using a force-independent release system, the method comprising:

providing the force-independent release system of claim 1, detecting a determined set passage of time or a determined set inflation pressure, sending information about the detected passage of time or the determined inflation pressure to a controller that causes release of the force-independent releasable link system.

16. A method for deploying an inflatable safety device using a force-independent release system, the method comprising:

providing the force-independent release system of claim 1, wherein once a determined set passage of time or a determined set inflation pressure is reached, a mechanical timer or mechanical pressure switch releases the force-independent releasable link system.

* * * * *